United States Patent [19]

Valadez

[11] Patent Number: 4,969,991

[45] Date of Patent: Nov. 13, 1990

[54] WATER PURIFYING AND DISPENSING SYSTEM

[76] Inventor: Gerardo M. Valadez, St. Joseph Water Corp., 630 E. Price Rd., Brownsville, Tex. 78521

[21] Appl. No.: 401,649

[22] Filed: Aug. 30, 1989

[51] Int. Cl.$^5$ ............................................. C02F 1/44
[52] U.S. Cl. .................... 210/96.2; 210/104; 210/109; 210/138; 210/143; 210/195.1; 210/195.2; 210/257.2; 210/258; 222/108; 222/189; 422/186.3
[58] Field of Search .............. 210/748, 96.1, 96.2, 210/104, 106, 108, 109, 138, 143, 195.1, 195.2, 257.1, 258, 257.2, 411, 416.3; 222/63, 67, 108, 189, 642, 644; 422/24, 186.3

[56] References Cited

U.S. PATENT DOCUMENTS

| | | | |
|---|---|---|---|
| 3,207,282 | 9/1965 | Norris, Jr. .............................. | 194/13 |
| 3,221,859 | 12/1965 | McAbee .................................. | 194/3 |
| 3,856,676 | 12/1974 | Grimme, Jr. et al. ................ | 210/96 |
| 3,921,855 | 11/1975 | Syverson ................................. | 222/67 |
| 4,160,727 | 7/1979 | Harris, Jr. ............................... | 210/23 |
| 4,528,093 | 7/1985 | Winer ...................................... | 210/96.2 |
| 4,623,467 | 11/1986 | Hamlin .................................... | 210/652 |
| 4,704,202 | 11/1987 | Poyner ..................................... | 210/108 |
| 4,773,993 | 9/1988 | Yoda et al. ............................... | 210/136 |
| 4,784,763 | 11/1988 | Hambleton et al. ............... | 210/195.2 |
| 4,801,375 | 1/1989 | Padilla ..................................... | 210/100 |
| 4,849,100 | 7/1989 | Papandrea .............................. | 210/138 |
| 4,902,411 | 2/1990 | Lin ........................................... | 210/104 |

*Primary Examiner*—Peter Hruskoci
*Attorney, Agent, or Firm*—David L. Mossman

[57] ABSTRACT

A vending or dispensing system for providing purified water in response to a customer request is described. The water dispensing system has a water reservoir or tank containing first stage purified water and is provided with a subsystem for circulating water from the reservoir through a microbial sterilizer on at least a periodic basis for a predetermined period of time to maintain water quality within the tank. In one aspect, the water is passed through the microbial sterilizer before entering the tank for the first time as first stage water. Additional features described to insure water purity include flushing or rinsing the lines between a first stage water purification mechanism and the water reservoir prior to topping off the reservoir with purified water, and providing control mechanisms for ensuring that sump liquid cannot be suctioned back into the system. The purification mechanism, of which there may be more than one, may include, but is not limited to, an activated carbon filter, an ion exchange resin bed, a reverse osmosis (RO) filter and the like. The microbial sterilizer may include such equipment as one or more or multi-stage ultraviolet (UV) sterilizers. In one embodiment, the entire system is operated by a microcontroller in response to user commands.

20 Claims, 7 Drawing Sheets

WATER PURIFYING AND DISPENSING SYSTEM

FIELD OF THE INVENTION

The invention relates to water dispensing systems, purified water vending machines and the like, and in one aspect relates to water dispensing systems having mechanisms for maintaining water purity such as by checking the functioning of the equipment, controlling water flows and the like.

BACKGROUND OF THE INVENTION

Water dispensing systems, such as machines that vend purified water in response to coin insertion and consumer operation or selection are well-known, particularly in areas where the local, municipal or rural or well-water supply is hard or distasteful, or where potable water is unavailable. A number of vending machines have been designed over the years to provide purified water. Typically, these machines take water from the local source which is often potable, but distasteful, and further purify it by known methods at the vending site for subsequent dispensing. The impurities removed from the water are often disposed of in an effluent stream to the local waste-water system, or to a local septic system.

For example, U.S. Pat. No. 3,207,282 teaches a liquid vending apparatus with liquid purifying mechanisms which consist of carbon filters and ion exchange resins. This system has part of its mechanism duplicated for the dispensing of one-gallon and five-gallon amounts. Subsequent systems typically use some sort of volume control mechanism, such as a flow meter.

U.S. Pat. No. 3,221,859 discloses a relatively simple apparatus for dispensing deionized water that has a back-up ion exchange tank when the primary ion exchange tank is spent. Like many water dispensing systems, this apparatus uses a purity sensor to detect the purity of the vended water and a relay to prevent water dispensing if the purity level is below an acceptable amount.

Another apparatus for purifying water involving pressure filtration is seen in U.S. Pat. No. 3,856,676. It employs a closed storage tank which receives treated water only, with controls for operation of the pressure filtration at intervals to maintain the water in the storage tank between selected levels, and for periodic flushing of the pressure filtration, the flushing water being discharged to the disposal of the rejected water.

Methods and apparatus utilizing staged reverse osmosis (RO) units for purifying and dispensing water are presented in U.S. Pat. No. 4,160,727. The apparatus of this patent also discusses a sump pan to catch spillage, reservoir overflow and reject (brine) flow from the RO stages, where a sump pump is automatically activated when the water reaches a predetermined level. U.S. Pat. No. 4,528,093 also teaches methods and apparatus for purifying and dispensing water using RO units, as well as ultraviolet (UV) sterilizers, and additionally provides mechanisms for adding minerals and electrolytes to the dispensed water at the command of the consumer to enhance its taste or to replenish electrolytes lost by the body.

A water purifying and vending apparatus using a particular design of UV sterilizer is set forth in U.S. Pat. No. 4,623,467. The overall system provides two different water paths, depending on the level of purity required by the consumer. It also includes a purity sensor as a check on dispensed water purity.

Additionally, U.S. Pat. No. 4,801,375 teaches a water vending system having a purity sensor, a RO unit, carbon filters, and a volume controller, among other mechanisms, which are run by a "signalling control means", such as an electronic controller. Water is recycled through the RO unit in an attempt to enhance purity. The vending system comprises control mechanisms for automatically dumping the filtered water stored in the tank in the system if there has not been at least a predetermined number of vends of water within a predetermined period of time. Further, contamination of the filtered water in the storage tank by breather air is prevented by UV sterilization of the air continuously before it enters the tank.

A chronological review of this technology will indicate that water dispensing or vending systems have become more complicated over time. To some extent, this increased complexity has been advantageous in that more safeguards and controls may be built into the apparatus, such as by the use of compact electronics. On the other hand, sometimes the increased complexity also contributes to greater likelihood of system breakdown, which is to be avoided.

In other cases, the new features may, in fact, introduce more problems than those solved. For example, in the system of U.S. Pat. No. 4,801,375, the tank contents are dumped if there have not been a predetermined number of vends within a given period of time. It is appreciated that this dumping technique will reduce the chance for bacteria growth within the tank during long periods between vends. However, such as system is potentially wasteful in that in some areas, or during some times, dumping may occur relatively frequently. Such a feature would be particularly disadvantageous if such a machine were in an area where good water is in short supply under the best of circumstances, such as remote arid, desert or semi-desert locales. Additionally, such a system is wasteful of water having value added to it, in the sense that it is already purified to at least some extent.

Thus, it would be advantageous if a water dispensing system could be developed which would avoid some of the problems enumerated above for prior systems, but which would be relatively simple, while providing all of the conveniences expected by the consumer.

SUMMARY OF THE INVENTION

Accordingly, it is an object of the present invention to provide a water purification and dispensing system which is designed to purify and dispense water in response to coin-operated, consumer demand.

It is another object of the present invention to provide a water dispensing system that conserves water while maintaining a high level of purity.

It is yet another object of the invention to provide a water dispensing system that is relatively simple in design, and which may be adapted to be controlled by conventional electronic microcontrollers. In carrying out these and other objects of the invention, there is provided, in one form, a water purifying and dispensing system having a service line for receiving water to be purified within the water dispensing system, a purification mechanism having an inlet and an outlet, where the water to be purified enters the inlet and exits at the outlet as first stage purified water over a supply line to a reservoir fill valve which controls entry to a water reservoir and a microbial sterilizer circulation system. The microbial sterilizer circulation system has a circulation pump for removing water from the water reservoir; a microbial sterilizer, and a mechanism for transmitting water from the circulation pump through the microbial sterilizer to the reservoir fill valve; and a mechanism for dispensing water from the reservoir.

In alternative aspects, the water may be periodically or essentially continuously circulated within the microbial sterilizer. The purification mechanism may be any suitable and conventional device, including, but not limited to, such devices as a carbon or other filter, an ion exchanger, a reverse osmosis filter, or the like. The microbial sterilizer may be an ultraviolet sterilizer or other device that reduces or eliminates living microorganisms within the water. The control mechanism may be electromechanical, a microcontroller, an assembly of discrete components, etc. or a combination thereof, or the like, but is not necessarily limited to these examples.

In one embodiment, the invention may be understood to contain five or more stages, as outlined below:

(1) The first stage is a purification mechanism, such as an RO filter or other device described above. The water entering the water purifying and dispensing system is passed through this mechanism to become "first stage water".

(2) The second stage is the microbial sterilizer described above. After the second stage, the water exiting the microbial sterilizer is placed in a water reservoir.

(3) The third stage may be thought of as a recirculation of the water from the reservoir through the microbial sterilizer at periodic intervals, regardless of the number of vends from the water purifying and dispensing system, to keep bacterial growth low in the reservoir. If the system is particularly busy dispensing water, then water within the reservoir may not necessarily experience this third stage. However, if there happens to be a long period of time between vends or dispenses, the reservoir water could go through many third stage treatments. In the latter case, the recirculation would keep this water free from living microbes during inactive periods.

(4) The fourth stage may be somewhat optional. Near the beginning of the dispense cycle, water is removed from the water reservoir and channeled into the fourth stage purification mechanism, which may be an activated carbon filter, RO purifier, ion exchange resin bed, etc.

(5) Upon leaving the fourth stage, the water may immediately enter the fifth stage which again may be the microbial sterilizer. One microbial sterilizer may be provided with two passes enabling it to perform the function of the second, third and fifth stages. One pass could serve for both the second and third stages and the other pass may serve as the fifth stage. For an example of this arrangement, see FIG. 1.

However, it will be appreciated that while this particular embodiment is possible to be described in sequential stages, as done above, that the invention is not necessarily limited to this sequence or order of stages, which sequence or order is defined by the appended claims. For example, more or less stages may be provided than five. See the discussion below for the optional inclusion of stages before the first stage. Further, the second and third stages may be thought of together as one state—a second stage as discussed below—since both use the same purifier (the microbial sterilizer) and much of the same piping.

DETAILED DESCRIPTION OF THE INVENTION

Figure 1:
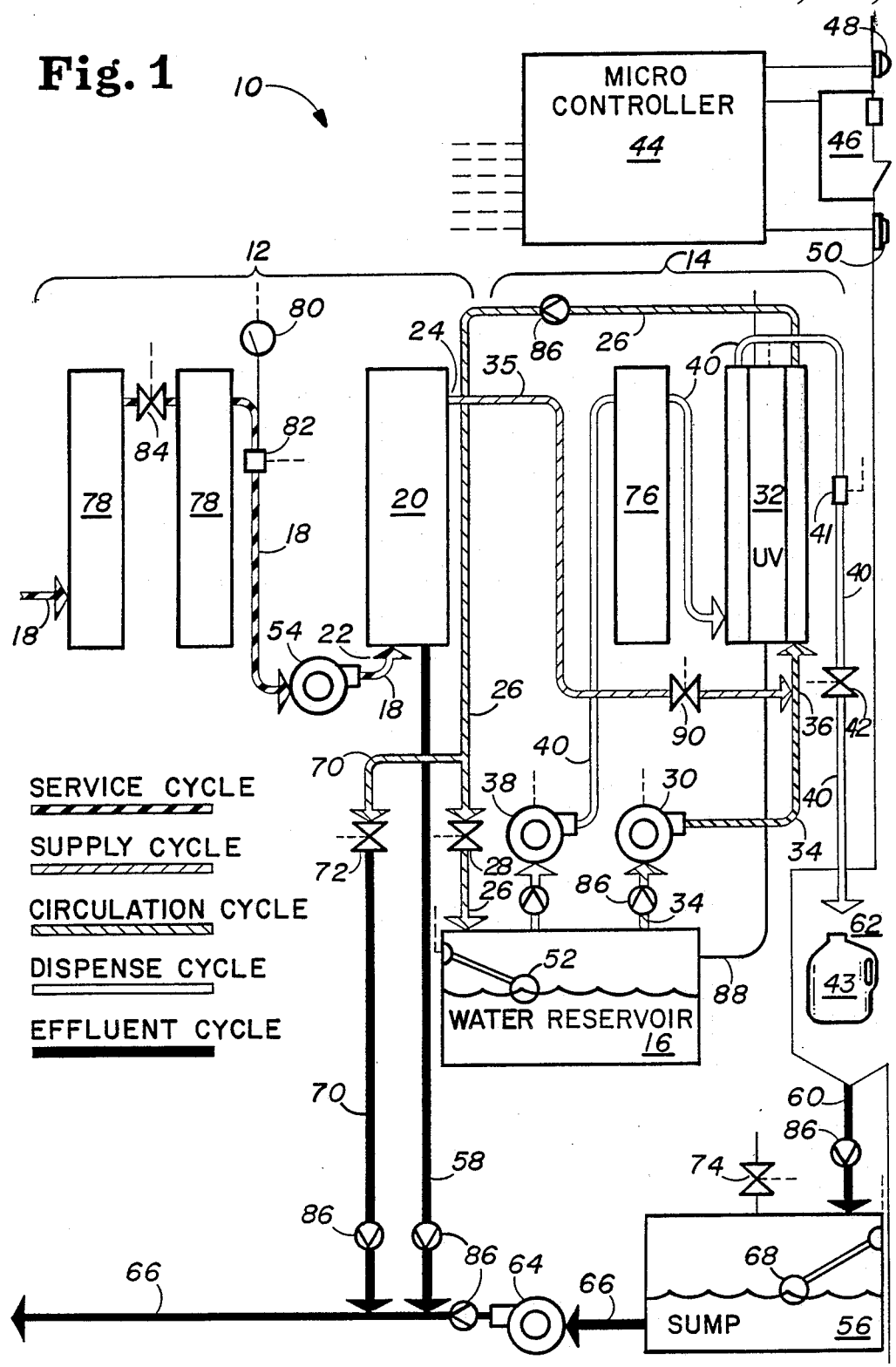
FIG. 1 is a schematic diagram of the water dispensing system of the present invention, showing an embodiment of the major parts.

The invention will now be described in more detail with reference to FIG. 1. The water purification and dispensing system as a whole 10 roughly has two main portions, first stage 12 and second stage 14 primarily divided by the placement of water reservoir 16 which contains the water to be dispensed. The system 10, in one of its most basic aspects includes, but is not limited to, a service line 18 for receiving water, such as from a municipal supply, a well, as example only, to be purified within the system 10. Line 18 delivers the water to be purified to a purification mechanism 20 having an inlet 22 and an oulet 24, where the water to be purified enters the inlet 22 and exits the mechanism 20 at the outlet 24 as first stage purified water over a supply line 35. Supply line 35 eventually connects to a reservoir fill valve 28 which controls entry to the water reservoir 16. In the embodiment illustrated in FIG. 1, this "first stage water" also passes through lines 34 and 26 before entering reservoir fill valve 28. The first stage water may pass to reservoir 16 without further treatment, or may go through another treatment, such as a microbial sterilizer 32, which may be an ultraviolet light sterilizer or the like. This step would insure that the water entering the reservoir 16 was free of live microorganisms. In such an embodiment, this pass through a microbial sterilizer may be considered a second stage.

However, in a simplified aspect of the invention, the second stage is the recirculation feature of the invention, which may also be termed, in one aspect, microbial sterilizer circulation system 14, in one sense a sub-system of the entire water purification and dispensing system 10, which sub-system comprises a circulation pump 30 for removing water from reservoir 16 to a second purification mechanism 32 over recirculation line 34 which is connected to supply line 35 at connection 36. The recirculating water enters microbial sterilizer 32 and returns to the reservoir 16 via supply/recirculation line 26 through reservoir fill valve 28. This recirculation occurs at least on a timed interval to reduce or eliminated live microbes in the water of the reservoir 16.

Another sub-system is the water dispensing mechanism, which may include, but is not limited to, dispenser pump 38 to draw water from reservoir 16 and pump it over dispensing line 40 through dispenser valve 42 to fill customer-provided container 43. Microcontroller 44 opens dispenser valve 42 for a set period of time to dispense a predetermined volume of water. A conventional fluid or flow meter may also be used in conjunction with the dispensing sub-system to ensure uniform vend volumes. In another embodiment, the dispensing line 40 makes another pass through microbial sterilizer 32 to ensure that the water dispensed meets at least a minimum level of purity. Thus, in this latter version, the last pass through the microbial sterilizer 32 could be considered a "third stage". If an optional activated carbon filter or other filter mechanism 76 is included in the dispensing line 40, mechanism 76 would be the "third stage" and microbial sterilizer 32 would become the "fourth stage". If microbial sterilizer 32 is included in the supply system, described as optional above, then filter mechanism 76 becomes the "forth stage" and the last pass through the microbial sterilizer 32 before dispensing would be the "fifth stage".

The invention also comprises a circulation control mechanism, which in one aspect is embodied in programmable microcontroller or computer 44, although it will be appreciated that the logic controlling the water purification and dispensing system 10 may be implemented by any suitable type of configuration, including, but not limited to electromechanical relays, microcontrollers, manual control, combinations thereof, etc. The circulation control mechanism controls the microbial sterilizer circulation system 14 and the water dispensing mechanism such that water from reservoir 16 is periodically circulated in the circulation system 14, except when the water supply purification mechanism 20 is being used. Circulation flush valve 90, if present, is normally closed during the circulation cycle. Thus, except during the supply or "first stage" cycle, the water is available for periodic or continuous circulation through the system, and through one or more of the purification mechanisms or stages. This circulation not only cycles the water through a microbiological purification stage, but also keeps the water in motion which also greatly inhibits bacteria growth. This periodic or continuous circulation is an advantage over the method of U.S. Pat. No. 4,801,373, where the bacteria growth problem is recognized, but unsatisfactorily solved by wastefully dumping the contents of the tank after a set period of inactivity.

The aspect of the invention described above will now be discussed in more detail with respect to various features, which may be understood to be somewhat optional and within the realm of design choice of the engineer specifying the construction of a water purification and dispensing system 10 of this invention. For example, purification stages or mechanisms 20, 32 and 76 may be, but are not limited to, such devices as activated carbon filters, ion exchange resin beds, reverse osmosis (RO) membrane filters, ultraviolet (UV) sterilizers and the like. In one aspect of the invention, the microbial sterilizer 32 is a UV sterilizer. While the invention may work without a microbial sterilizer 32 in the position shown in FIG. 1, it is believed desirable to have a microbial sterilizer in the recirculation loop if the goal is to reduce or eliminate living microorganisms. Also, if a UV sterilizer is used, it has the advantage of not deteriorating, such as by clogging or discharging, over time as do some of the other filters, since water is often flowing through it while the water dispensing system 10 is idle. However, other techniques, filters, etc. may be used, if desired.

As explained, in one aspect of the invention the circulation mechanism is implemented as a combination of hardware and software within a microcontroller. The control logic of the first control mechanism, and the ones subsequently discussed, may be implemented in other ways as well, such as by wiring discrete components, or even by use of electromechanical relays. Connections to the microcontroller 44 of FIG. 1 are schematically represented by short, dashed lines for the sake of clarity. The types of connections and the circuit involved in the physical implementation of the electronics of the invention are elementary to those skilled in the art, and the actual circuitry is routine. What is important is that the water dispensing system 10 be piped as claimed and that the appropriate control logic be present to supervise system 10, regardless of how the logic is implemented. It will further be appreciated that the valves of the system 10, such as reservoir fill valve 28 and dispenser valve 42 are controlled (open and closed by commands from the control logic.

There are many other aspects of the invention, some of which are more preferred than others. For example, the invention may comprise a quality control mechanism for ensuring that the second purification mechanism 32, for example, a UV sterilizer, is functioning before any purified water is dispensed. As noted, in one embodiment of the invention, microbial sterilizer 32, is a two stage UV sterilizer 32 where the water circulating in the circulation system 14 passes through one side of the sterilizer 32 (the right-hand side as depicted in FIG. 1), and where the water to be dispensed passed through the other or second side of the sterilizer 32 (the left-hand side as shown in FIG. 1). The second control mechanism may again be any of the forms as the first control mechanism, in one embodiment a microcontroller 44 which is connected to UV sterilizer 32 and which senses whether it is operational, and, if not, disables coin receiving and counting mechanism 46. In this way, a minimum purity level of the dispensed water is ensured. If microcontroller 44 disables the coin receiving mechanism 48, it may be desirable to also activate an indicator light 48 to show that the system 10 is out-of-order.

A conventional part of most public water purification and dispensing systems 10 which vend water in exchange for money, as in the form of coins, bills, coded payment card, etc., is a coin receiving and counting mechanism 46, which may be any such mechanism well known in the vending art. Various indicator lights 48 and control buttons 50 would also be contemplated to enable the consumer to perform the usual functions, such as controlling the extent of purification to some degree, activating a coin return, and to be informed that the system 10 is operating normally, or is out-of-order, as in the instance described in the previous paragraph. These features of the invention are conventional, and include other conventional embodiments, such as voice synthesis to indicate proper operation to the consumer.

Another useful feature involves the use of a reservoir level indicator 52 in water reservoir 16 which measures the water level in reservoir 16 and transmits it to microcontroller 44. By use of a reservoir level control mechanism in microcontroller 44, the water level in reservoir 16 is checked by receiving information from indicator 52 and, if low, a first stage pump 54 is activated to pump water through RO filter 20 via service line 18, over supply line 35, through microbial sterilizer 32, over supply/circulation line 26 to reservoir fill valve 28 which has been opened by microcontroller 44 to fill the reservoir 16 so that the system 10 will be ready to dispense water on command. Reservoir level indicator 52 may take any suitable form, such as mercury float switches, moisture (conductivity) proximity sensors, and the like. However, in the implementation contemplated in the present invention, reservoir level indicator 52 would be checked by the reservoir level control mechanism periodically as timed by the clock cycle of the microcontroller 44. Some prior systems would fill the tank every time the level indicator indicated the level low, which does not usually smoothly fit into the control logic. Another way in which the level check is done by other systems is for the controller to count the number of vends, and then fill the tank when the value in controller memory indicates the level is low. This latter method has the disadvantage of not knowing the actual level of the water in the reservoir. If the metering of the volume of water in a vend varies at all, the value of water volume in controller memory will become inaccurate over time and a refill may be required when the controller does not perform one.

A sump 56 may also be provided to accept any effluent or concentrate from a filtration device, such as from RO filter 20 via an effluent line. For example, although the system 10 illustrated in FIG. 1 shows RO filter 20 effluent line 58 and flush line 70 directly connected to drain line 66 which may to the municipal waste water conduit, e.g., they may alternatively drain into sump 56. A drain 60 under the dispensing area 62 may also be channeled to the sump 56 so that in the event of spillage in the dispensing operation the water is correctly disposed of. Sump 56 is provided with sump pump 64 to drain sump 56 through drain line 66. In one aspect of the invention, sump 56 also has sump level indicator 68 in sump 56 which measures the water level in sump 56 and transmits a value to microcontroller 44. By use of a sump level control mechanism in microcontroller 44, the water level in sump 56 is checked by receiving information from indicator 68 and, if high, sump pump 64 is activated to pump water through drain line 66. Again, in the implementation contemplated in the present invention, sump level indicator 68 would be checked by the sump level control mechanism periodically as timed by the clock cycle of the microcontroller 44. In this way, draining of the sump 56 would be timed by clock cycle, rather than by only waiting for the sump level to rise to a certain point. The clock cycle used for the sump 56 checks should be timed to circumvent any possible overflow of the sump 56.

Another feature of the present invention is all pumps 30, 38, 54 and 64 and all valves, such as 28 and 42, are not energized except when specifically turned on or switched. That is, current is not applied to the pumps or the valves or solenoids or other electromechanical movers except when actually needed. Each valve, motor or pump rely on each other and the microcontroller logic to receive an energized signal. That is, the valves, motors and pumps may be roughly considered to have their power supplies wired in series, so that if one piece of equipment fails, the microcontroller can read data but cannot write instruction to the equipment. This would also provide additional safeguards to the overall system 10. Of course, in the event of such mechanical breakdown, it would be desirable for the microcontroller to indicate via lights 48 that the system 10 is out of order. Some prior systems would keep such equipment continually energized, or keep solenoid coils charged, etc. with the result that equipment often burned out before the expiration of its normal lifetime. An advantage of using microcontroller 44 is that more precise control may be had over the operation of the various system 10 equipment.

It is another attribute of the invention to provide flush line 70 extending from supply/circulation line 26 at a point between the microbial sterilizer 32 and the reservoir fill valve 28 to the drain line 66. Rinse valve 72, is also connected to microcontroller 44 for control thereby, is present in flush line 70 between supply/circulation line 26 and drain line 66. A rinse control mechanism, which again may be part of microcontroller 44, checks that the sump pump 64 is not on before rinse valve 72 is opened. This prevents the possibility of sump water backing into first line 26 and possibly reservoir 16 at the start-up of sump pump 64, such as by back-suction or other phenomenon. It may be desirable to provide a breather valve 74 in sump 56 to permit breather air over the sump water level in sump 56 when sump pump 64 is activated to drain sump 56.

In the dispensing portion of the system, there is provided a dispenser pump 38 connected to water reservoir 16, where the pump runs purified water over dispensing line 40 to dispenser valve 42. A volume control mechanism may be present in the microcontroller for starting the dispenser pump 38 for a predetermined period of time, such as three seconds, by way of example only, to pre-pressurize the system before the dispenser valve 42 is opened by the volume control mechanism. This prepressurization steps enables uniform volume dispensing of the water, whereas without this step there may be some variation in the volume of each vend due to non-uniform initial pressures in line 40 from vend to vend. If desirable, a volume control or flow meter 41 may be used to ensure that the proper volume has been dispensed.

Dispensing line 40 preferably goes through at least one microbial sterilizer mechanism 32, such as a UV filter, which may be a two-stage UV filter as depicted in FIG. 1. However, the water to be dispensed may also pass through another filter 76, which may be an RO filter, ion exchange resin bed, activated carbon bed, etc.

Another useful feature of the present invention is the presence of a flushing routine in the controlling logic to provide additional protection to the purity of the water to be dispensed. This part of the water dispensing system 10 involves a flush control mechanism in the logic of the microcontroller 44 that performs the following sequence: (1) closes reservoir fill valve 28, (2) opens rinse valve 72, (3) flushes flush line 70 with first stage water, (4) closes rinse valve 72, and (5) opens reservoir fill valve 28 to permit first stage water to enter reservoir 16. Circulation flush valve 90 is normally open during this cycle. In this way, any contamination that may be present in lines 26, 35 and 70, such as bacteria build-up, for example, may be flushed out prior to the introduction of newly made first stage water from RO filter 20 to reservoir 16.

There are other alternatives features of the water dispensing system 10 depicted in FIG. 1 that may be desirably incorporated. For example, one or more prefilters 78 may be present between service line 18 and RO filter 20. Prefilters 78 may also be any of the conventional type of filters, such as activated carbon, RO membranes, ion-exchange beds, etc. or new filters that maybe developed. Also useful are pressure gauge 80 and pressure switch 82, which provide input to and direction from, respectively, the microcontroller 44. The microcontroller 44 may thus sense whether the water pressure in service line 18 is not high enough or too high by means of gauge 80, and if so, shut down the system 10 via switch 82 and display an "out-of-order" display on indicator lights 48. Too low of a pressure may not provide enough water or force for the system 10 to function properly whereas too much pressure may damage the filters and other equipment. In one embodiment, service line 18 pressure should be greater than 10 and less than 50 psi, otherwise the control logic will perform a shutdown of the system 10. The exact preferred range of input or service pressure will depend on the precise design of the system.

It will be appreciated that other pressure check subsystems may be advantageously employed in the system 10 of the present invention. A constant pressure valve 84, that may be solenoid controlled by the microcontroller 44, may be advantageously placed between the prefilters 78 in order to controllably admit water into water purification and dispensing system 10. One-way check valves 86 also help prevent undesirable back flows during the various pumping operations to ensure that impure water, such as concentrate from RO filter 20 effluent line 58, does not contaminate the pure water. Check valves 86 may also be usefully employed around the lines 60 to the sump 56, fluch line 70, lines 34 and 40 from the reservoir 16, and on the drain line 66 as shown in FIG. 1.

Another optional feature of the invention is breather air line 88 over resevoir 16. Such breather air line 88 may advantageously pass through a port in UV sterilizer 32 to maintain a low or non-existent level of living microbes in the water of reservoir 16.

The invention will be still further described with respect to the control logic flow diagrams in FIGS. 2 through 7, which together form one complete program when considered together in proper sequence. It will be appreciated that the logic set forth in instructions 200–266 of FIGS. 2–7 are simply one, non-limiting method of implementing the control portion of the invention and that there are other ways of implementing the claimed invention. Further, the particular embodiment of the control logic in FIGS. 2–7 is not intended to be a complete implementation of all of the possible control mechanisms discussed above, nor is the implementation of the exemplary control logic only implementable in a microcontroller or other integrated circuit device. Electronic circuits wire with discrete components, electromechanical relays systems, manual control, and the like may also be suitable. Additionally, it will be appreciated that the wait times given in the logic of FIGS. 2–7 are for example only, and do not limit the invention.

Figure 2:
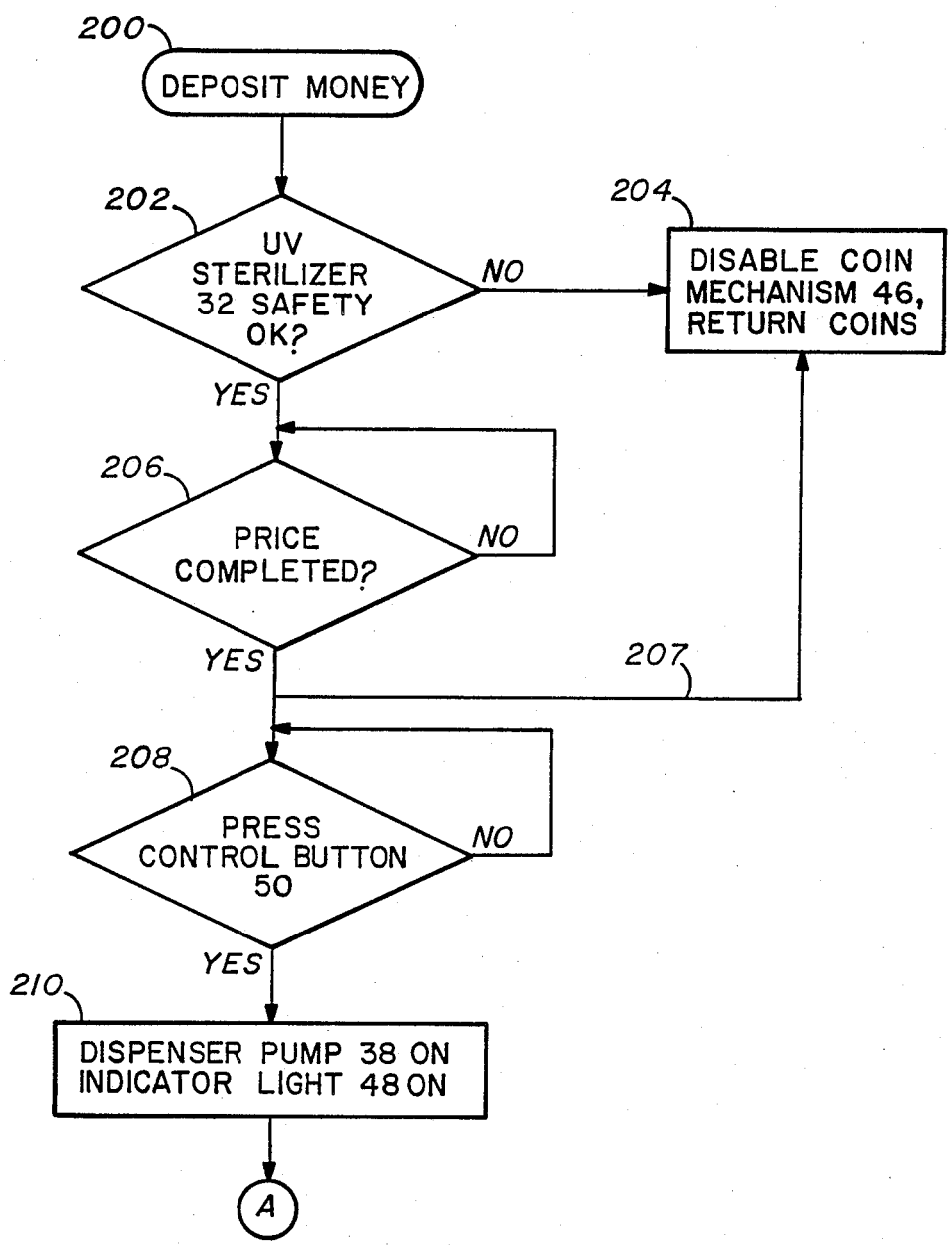
FIG. 2-7 are flow chart diagrams, which together form the logic for one embodiment of the present invention.

The particular embodiment of control logic illustrated may be understood by starting at the top of FIG. 2 with the indication 200 that money is being deposited into coin mechanism 46. Immediately, a check 202 is done to determine if ultraviolet sterilizer 32 is operational, that is, is it functioning and is it safe to dispense water? If UV sterilizer 32 is not functioning properly, the instruction 204 is given to disable coin mechanism 46 and return the coins inserted so far. If UV sterilizer 32 is working properly, then the microcontroller 44 counts coins until the correct price is completed, as at statement 206. If the correct number of coins are deposited, the coin mechanism is disabled, as by path 207.

Optionally, the program may require the depression of a control button 50, as at statement 208 to proceed. This action initiates the start of dispenser pump 38 and activates an indicator light 48 to tell the consumer that the system 10 is working properly and ready to dispense water. The customer should have, by this time, placed a container 43 in dispensing area 62 to receive the water.

Figure 3:
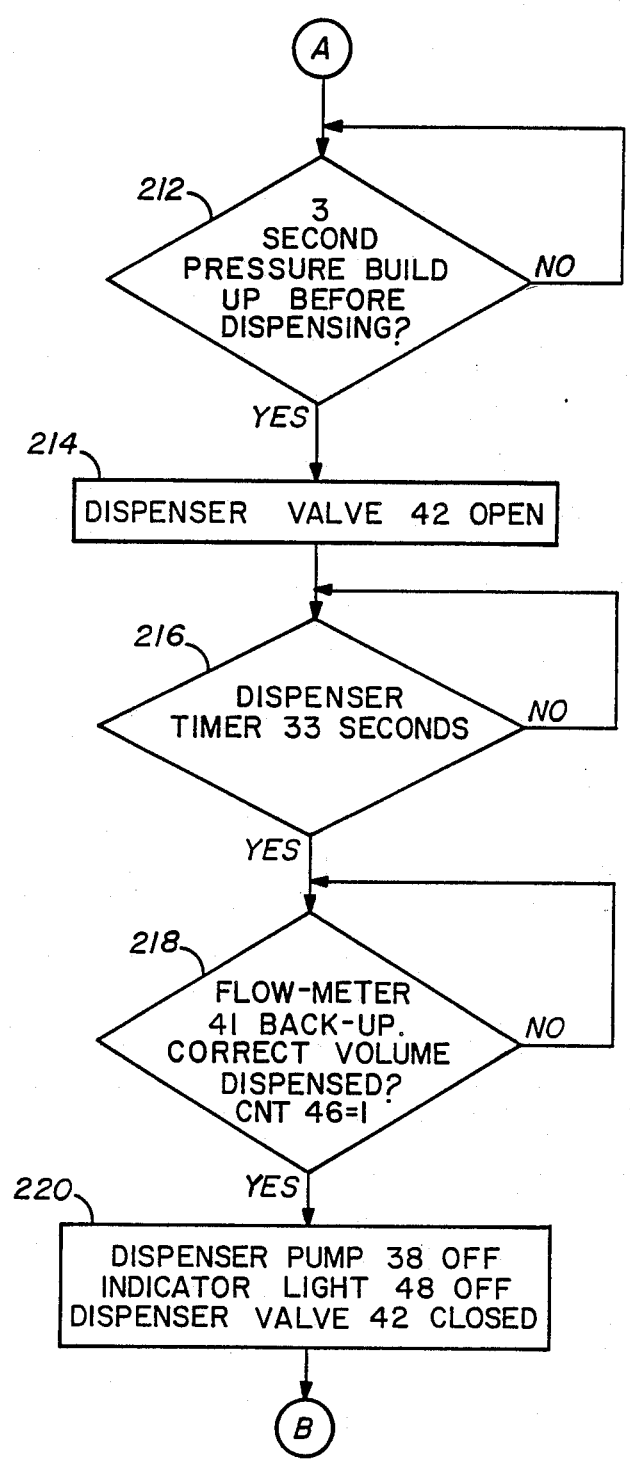

Shown in FIG. 3, is instruction 212 where pressure is built up in the system for a short period of time, such as three seconds. As explained earlier, this ensures a more uniform dispensing volume from vend to vend. After this short wait time, instruction 214 directs dispenser valve 42 to open. The duration of the dispense is timed as at statement 216. Obviously, the dispense time depends on a number of factors, including, but not necesarily limited to, dispense pressure, valve 42 opening, etc. As a check, input from an optional flow meter could indicate to the microcontroller 44 that the correct volume had not yet been dispensed thereby keeping dispenser valve 42 open somewhat longer, as at instruction 218.

Figure 4:
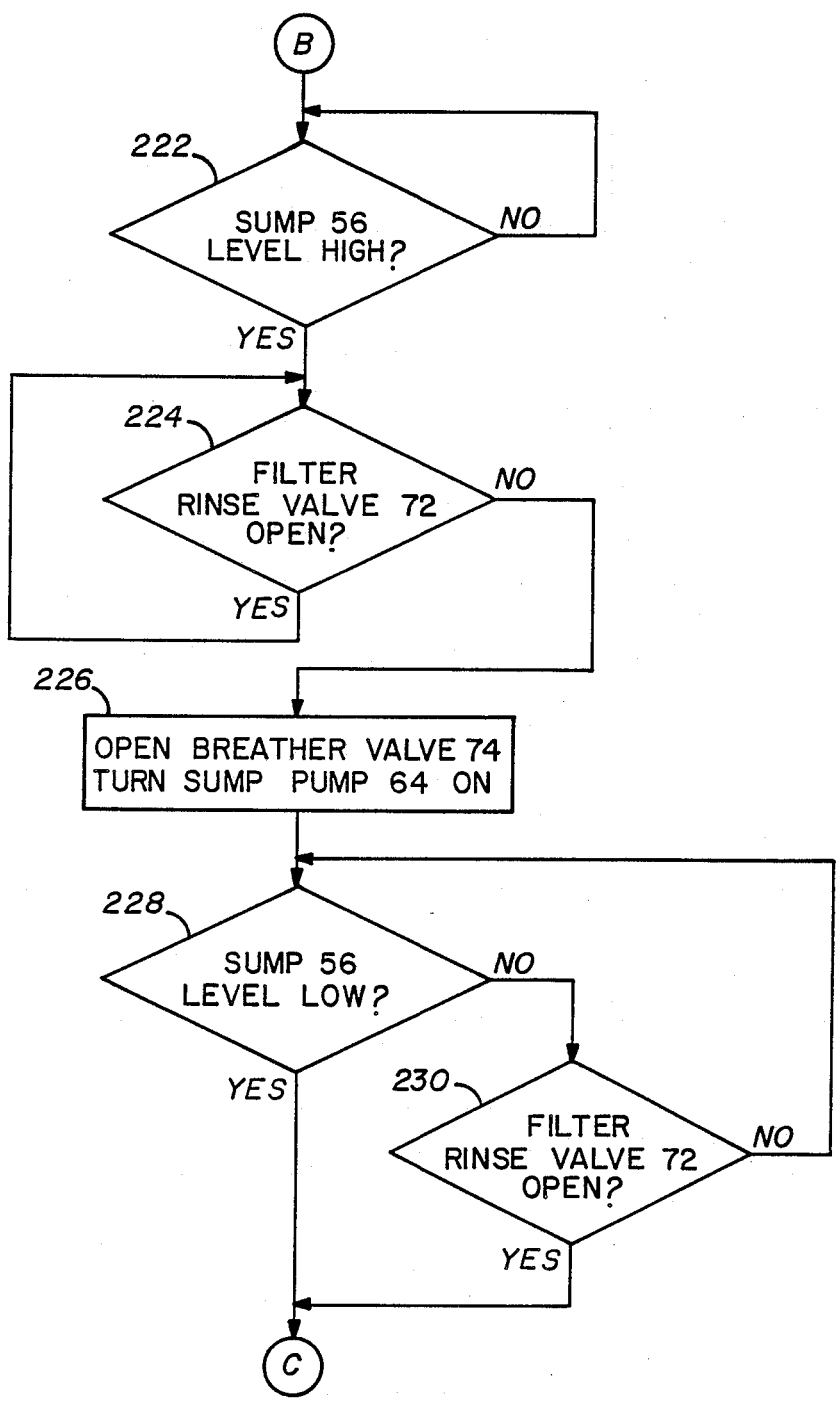
Figure 5:
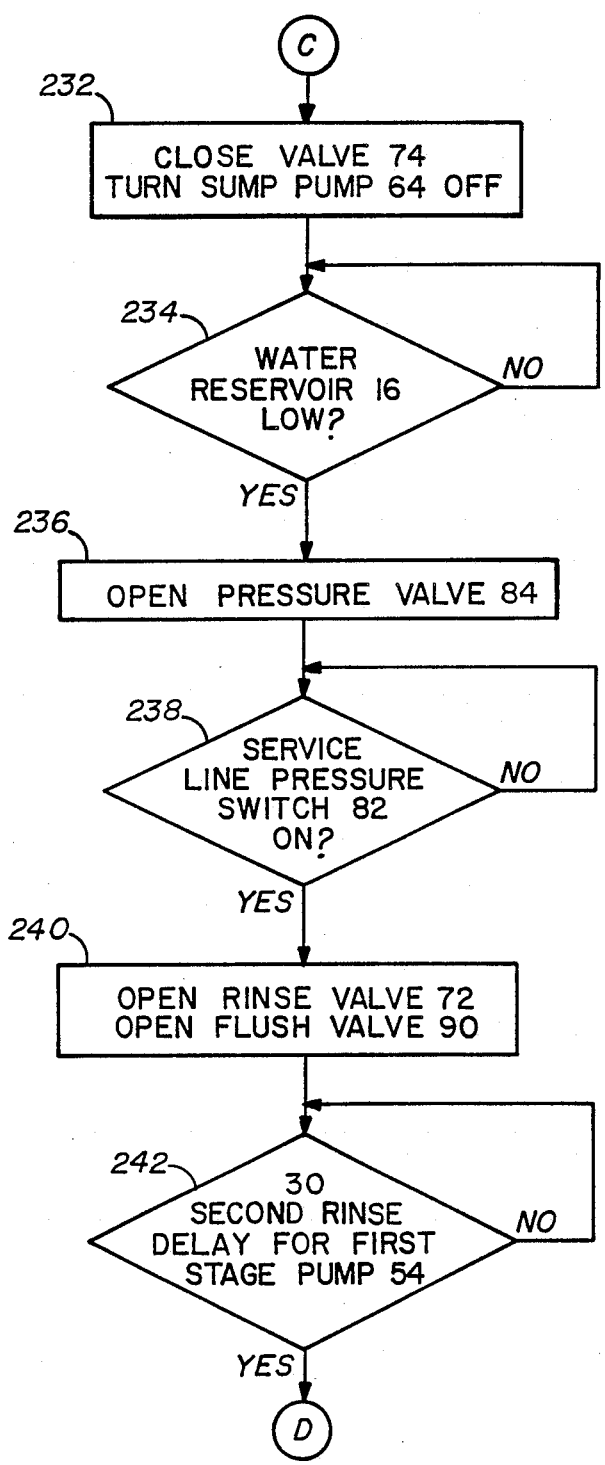
Figure 6:
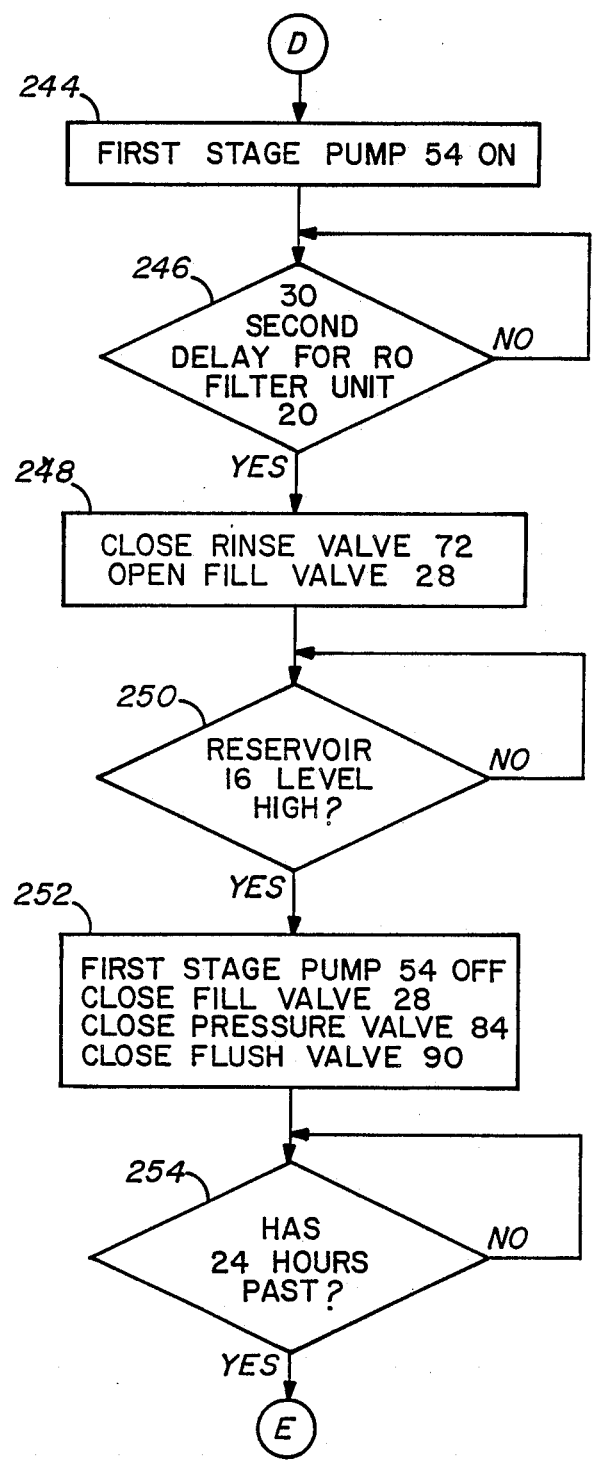
Figure 7:
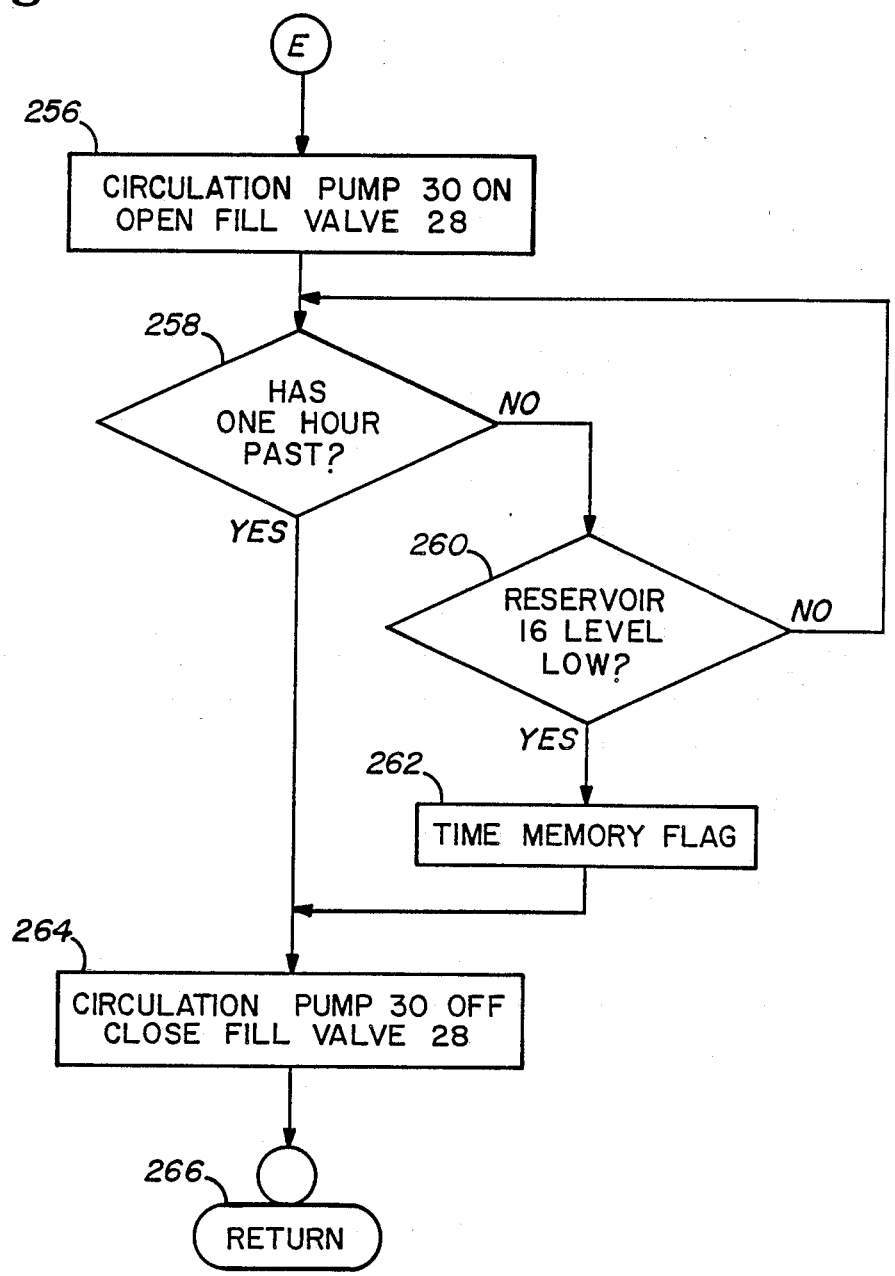

After the appropriate dispense interval, the dispense pump 38 is turned off, the indicator light 48 is turned off, and dispenser valve 42 is closed; as shown by instruction 220. Next, as shown in FIG. 4, the level in sump 56 is checked to see if it is high, at statement 222. If so, as discussed earlier, the microcontroller 44 checks to see if rinse valve 72 is open as at statement 224. If not, and the sump 56 level is high, then a drain of the sump 56 is initiated by opening breather valve 74 and turning the sump pump 64 on, as indicated at statement 226. At instructions 228 and 230, if the sump 56 level remains high and the filter rinse valve remains closed, sump 56 draining continues. However, if the sump 56 level goes low or if the filter rinse valve 72 opens, the sump 56 draining procedure stops by closing valve 74 and turning the sump pump 64 off as shown at instruction 232.

Next, a check is done on the level in the water reservoir 16 by instruction 234. If the level is low, pressure valve 84 is opened by statement 236, serving as the inlet permitting water from the service line 18 to enter water purification and dispensing system 10. The service line pressure switch 82 is checked to be sure it is on or open at instruction 238, after which the filter rinse valve 72 and the circulation flush valve 90 are opened by instruction 240. Statement 242 times a rinse delay for pump 54, after which first stage pump 54 is turned on by instruction 244. Next, the rinse or flush of the system is performed, previously discussed, by timing a 30 second delay for the RO filter unit 20, according to statement 246. Again, the exact time period for the flush or rinse of the system 10 before it starts "making water" will depend on how much piping needs to be flushed and the speed/pressure of the flushing water. After the appropriate time period, the rinse valve 72 is closed and reservoir fill valve 28 is opened via instruction 248 to permit first stage purified water (which may also have passed through a microbial sterilizer 32) to enter reservoir 16 until the water level in reservoir 16 is high as detected by logic statement 250. When the reservoir 16 level is high enough, first stage pump 54 is turned off, and reservoir fill valve 28, pressure valve 84 and flush valve 90 are all closed, according to instruction 252.

In the control implementation of FIGS. 2–7, the circulation of second stage 14 is not continuous, but is timed to occur once every 24 hours, to use a somewhat arbitrary time period, for example only. The circulation must occur often enough to disrupt bacterial growth by means of the second purification mechanism 32 through which the water is circulated. This circulation is accomplished by timing 24 hours according to the microcontroller 44 clock by instruction 254. If the preset time period has past, then circulation pump 30 is turned on and reservoir fill valve 28 is opened by statement 256 of FIG. 7. After another period of time, such as an hour, which is used for example only in statement 258, the reservoir 16 water level is checked at instruction 260. This step is necessary in the event a first stage "make water" step or a vend is performed during the one hour circulation period. In the case of an interrupt, the time memory flag command at 262 restarts the remainder of the circulation cycle if it is interrupted for a reservoir fill cycle or a dispense cycle. If the reservoir 16 level is not low and the circulation has occurred for the preselected period of time, then the circulation pump 30 is turned off and fill valve 28 is closed, as at instruction 264. The program is then returned at 266 to loop the logic back to the beginning at FIG. 2. In one embodiment, it may be desirable to time the check on the recirculation cycle to occur at a period of low activity or few vends, such as late at night or early in the morning to avoid wear on the system and inconvenience to the customer.

It will be appreciated that the recirculation feature of this system 10 has an important advantage over prior apparatus, such as that seen in U.S. Pat. No. 4,801,375, which dump the equivalent of first stage purified water according to a timed inactivity cycle. Not only are such systems wasteful of water, but they waste energy and cause wasteful first stage equipment wear by dumping water that has already been put through some of the purification steps.

Many modifications may be made in the methods and apparatus of the present invention without departing from the spirit and scope of the invention which are defined only in the appended claims. For example, it will be appreciated that the water dispensing system may comprise many components on the way from the service line to the dispensing valve and that some of these components may be deleted or added to form various systems which may have more or less of the claimed features of the invention, depending on the particular design of the system to accommodate the locale and desires of the expected customers.

I claim:

1. A water purifying and dispensing system comprising
    a service line for receiving water to be purified within the water dispensing system;
    a purification means having an inlet and an outlet, where the water to be purified enters the inlet from said service line and exits at the outlet as first stage purified water over a supply line to
    a reservoir fill valve which controls entry of water from said supply line to a water reservoir;
    a microbial sterilizer circulation system comprising:
        a circulation pump for removing water from the water reservoir;
        a microbial sterilizer; and
        means for transmitting water from the circulation pump through the microbial sterilizer to the reservoir fill valve; and
    means for dispensing water from the reservoir by passing water through said microbial sterilizer to a dispenser valve.

2. The water purification and dispensing system of claim 1 further comprising circulation control means for controlling the microbial sterilizer circulation system and the purification means, where water is circulated within the microbial sterilizer when the water is not passing through the purification means.

3. The water purifying and dispensing system of claim 1 where
    the microbial sterilizer is an ultraviolet sterilizer;
    the means for dispensing water passes water from the reservoir through the ultraviolet sterilizer prior to dispensing; and
    quality control means is present for insuring proper operation of the ultraviolet sterilizer before permitting the dispensing of water.

4. The water purifying and dispensing system of claim 1 where the system further comprises:
    a water level in the reservoir;
    a first stage pump for providing water to the purification means through the service line;
    a reservoir level control means for checking the water level in the reservoir and controlling the first stage pump to provide water to the purification means to fill the reservoir over the supply line; and
    a microcontroller having a clock;
    where the reservoir level control means is part of the microcontroller; and the reservoir level control means checks the water level in the reservoir at an interval timed by the clock.

5. The water purifying and dispensing system of claim 1 where the system further comprises
    a sump, which has a liquid level;
    an effluent drain extending from beneath the dispenser valve to the sump;
    a drain line from the sump;
    a sump pump for taking water from the sump and removing it from the sump through the drain line; and
    a sump level control means for checking the water level in the sump and controlling sump pump to empty effluent from the sump over the drain line; and
    a microcontroller having a clock;
    where the sump level control means is part of the microcontroller and the sump level control means checks the water level in the sump at an interval timed by the clock.

6. The water purifying and dispensing system of claim 1 where the system further comprises
    a drain line;
    a flush line extending from the supply line at a point between the purification means and the reservoir fill valve, to the drain line;
    a rinse valve in the flush line; and
    rinse control means for checking that the sump pump is not on before opening the rinse valve.

7. The water purifying and dispensing system of claim 1 where the means for dispensing water further comprises
    a dispensing line connecting the reservoir to
    a dispenser valve;
    a dispenser pump in the dispensing line for pumping water from the reservoir over the dispensing line to the dispenser valve;
    a volume control means for starting the dispenser pump for a predetermined period of time before the dispenser valve is opened by the volume control means.

8. The water purifying and dispensing system of claim 1 where the system further comprises
    a sump;
    a sump pump to drain the sump;
    a flush line extending from the first line at a point between the first purification means and the reservoir fill valve to the sump;
    a rinse valve in the flush line; and
    a flush control means for performing the sequence:
        closing the reservoir fill valve;
        opening the rinse valve;
        flushing the flush line with first stage water;
        closing the rinse valve; and
        opening the reservoir fill valve to permit first stage purified water to enter the reservoir.

9. The water purifying and dispensing system of claim 1 where the purification means is a reverse osmosis filter.

10. The water dispensing system of claim 1 where the purification means is the microbial sterilizer.

11. The water dispensing system of claim 1 where the circulation control means causes water to be circulated within the microbial sterilizer during a predetermined interval, except when water is being purified through the purification means.

12. The water dispensing system of claim 1 where the circulation control means causes water to be continuously circulated within the microbial sterilizer, except when water is being purified through the purification means.

13. A water purifying and dispensing system comprising
- a service line for receiving water to be purified within the water dispensing system;
- a purification means having an inlet and an outlet, where the water to be purified enters the inlet from said service line and exits at the outlet as first stage purified water over a supply line to
- a reservoir fill valve which controls entry of water from said supply line to a water reservoir;
- a microbial sterilizer circulation system comprising:
  - a circulation pump for removing water from the reservoir;
  - a microbial sterilizer; and
  - a recirculation line for transmitting water from the circulation pump through the microbial sterilizer to the supply line;
- means for dispensing water from the reservoir by passing water through said microbial sterilizer to a dispenser valve;
- circulation control means for controlling the microbial sterilizer circulation system and the means for dispensing water, where water is periodically circulated within the microbial sterilizer means for a predetermined period of time, except when water is being purified through the purification means;
- a sump;
- a sump pump to drain the sump;
- a flush line extending from the supply line at a point between the purification means and the reservoir fill valve to the sump;
- a rinse valve in the flush line; and
- a rinse control means for checking that the sump pump is not on before opening the rinse valve.

14. The water purifying and dispensing system of claim 13 where the system further comprises:
- a water level in the reservoir;
- a first stage pump for providing water to the purification means through the service line;
- a reservoir level control means for checking the water level in the reservoir and controlling the first stage pump to provide water to the purification means to fill the reservoir over the supply line; and
- a microcontroller having a clock;
- where the reservoir level control means is part of the microcontroller; and
- the reservoir level control means checks the water level in the reservoir at an interval timed by the clock.

15. The water purifying and dispensing system of claim 13 where the system further comprises
- a sump, which has a liquid level;
- at least one effluent drain extending from other portions of the water dispensing system to the sump;
- a drain line from the sump;
- a sump pump for taking water from the sump and removing it from the sump through the drain line; and
- a sump level control means for checking the water level in the sump and controlling sump pump to empty effluent from the sump over the drain line; and
- a microcontroller having a clock;
- where the sump level control means is part of the microcontroller and the sump level control means checks the water level in the sump at an interval timed by the clock.

16. The water purifying and dispensing system of claim 13 where the means for dispensing water further comprises
- a dispensing line connecting the reservoir to
- a dispenser valve;
- a dispenser pump in the dispensing line for pumping water from the reservoir over the dispensing line to the dispenser valve;
- a volume control means for starting the dispenser pump for a predetermined period of time before the dispenser valve is opened by the volume control control means.

17. The water purifying and dispensing system of claim 13 where the system further comprises:
- a sump;
- a sump pump to drain the sump;
- a flush line extending from the first line at a point between the first purification means and the reservoir fill valve to the sump;
- a rinse valve in the flush line; and
- a flush control means for performing the sequence:
  - closing the reservoir fill valve;
  - opening the rinse valve;
  - flushing the flush line with first stage water;
  - closing the rinse valve; and
  - opening the reservoir fill valve to permit first stage purified water to enter the reservoir.

18. The water purifying and dispensing system of claim 13 where the purification means is a reverse osmosis filter.

19. The water purifying and dispensing system of claim 13 where the purification means is the microbial sterilizer.

20. A water purifying and dispensing system comprising
- a service line for receiving water to be purified within the water dispensing system;
- a purification means having an inlet and an outlet, where the water to be purified enters the inlet from said service line and exits at the outlet as first stage purified water over a supply line to
- a reservoir fill valve which controls entry of water from said supply line to a water reservoir;
- a microbial sterilizer circulation system comprising:
  - a circulation pump for removing water from the reservoir;
  - a microbial sterilizer; and
  - means for transmitting water from the circulation pump through the microbial sterilizer to the reservoir fill valve;
- means for dispensing water from the reservoir by passing water through said microbial sterilizer to a dispenser valve;

circulation control means for controlling the microbial sterilizer circulation system and the means for dispensing water, where water is periodically circulated within the microbial sterilizer for a predetermined period of time, except when water is being purified through the purification means;
a sump;
a sump pump to drain the sump;
a flush line extending from the supply line at a point between the purification means and the reservoir fill valve to the sump;
a rinse valve in the flush line;
a rinse control means for checking that the sump pump is not on before opening the rinse valve;
a flush control means for performing the sequence:
　closing the reservoir fill valve;
　opening the rinse valve;
　flushing the flush line with first stage water;
　closing the rinse valve; and
　opening the reservoir fill valve to permit first stage water to enter the reservoir; and
where the circulation, rinse and flush control means are embodied in an apparatus selected from the group consisting of a computer, a microcontroller, an assembly of electromechanical relays, and a combination thereof.

* * * * *